Oct. 11, 1966 D. GAWRELUK 3,277,999

BALE THROWER

Filed Sept. 21, 1964 2 Sheets-Sheet 1

INVENTOR.
DEMETER GAWRELUK
BY
WILSON, SETTLE & CRAIG
ATTORNEYS

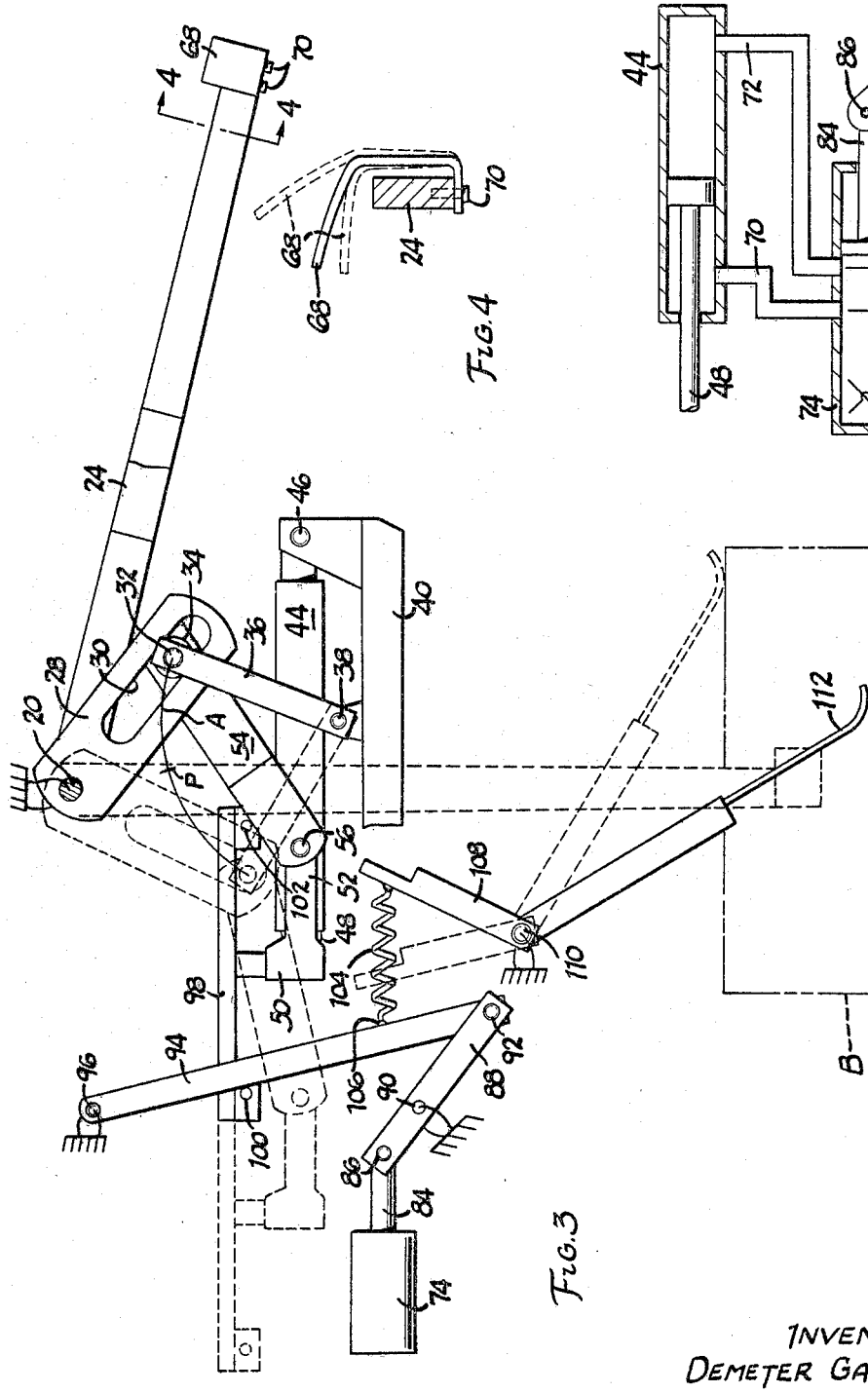

3,277,999
BALE THROWER
Demeter Gawreluk, Davenport, Iowa, assignor to J. I. Case Company, Racine, Wis., a corporation of Wisconsin
Filed Sept. 21, 1964, Ser. No. 397,722
3 Claims. (Cl. 198—128)

This invention relates to bale throwers, and more particularly to an automatically operable bale thrower for receiving hay bales from a pickup hay baler and throwing the bales into a wagon trailed behind the hay baler.

Bale throwers of the type with which the present invention is concerned are a rather recent development, aimed specifically at reducing the amount of manual labor in the field-to-storage handling cycle. A comparison of the labor requirements of various systems compared to those employing a bale thrower, together with a discussion of other economic factors and features of the bale throwing system, appears in the May 21, 1964 issue of "Implement and Tractor" magazine.

At the present time, bale throwers are customarily manufactured and sold as a separate unit for installation on an existing baler. Because of the variations in structure and mechanism in the wide variety of present day baling machines, difficulties are encountered in designing a bale thrower which is equally well adaptable to balers made by all of the leading manufacturers. This problem is especially acute where the bale thrower is not provided with its own power unit and is designed to be driven either by the power takeoff shaft of the tractor or from the baler drive mechanism.

The bale thrower must be capable of throwing a bale which may weigh 40 pounds or more to the rearward end of a trailing wagon, and also to throw the bale in a trajectory which is high enough to clear the relatively high sides of the trailing wagon. To keep the overall dimensions of the bale thrower within reasonable limits, it is necessary to accelerate the bale from substantially a rest condition to a substantial velocity in a relatively short space, and this requirement calls for parts which are capable of withstanding substantial strain and shock while in use. In those cases where reciprocating or oscillating parts are employed, a further problem arises at the end of a stroke where a rapidly moving part must be stopped within a relatively short distance.

It is one object of the present invention to provide a bale thrower readily adapted for mounting on a wide variety of balers which does not require a mechanical driving connection to the baler or tractor.

It is another object of the invention to provide a bale thrower having pivotally oscillatable bale throwing arms which are smoothly accelerated and decelerated at each end of their stroke.

It is another object of the invention to provide a bale thrower which is automatically cyclically operable in response to the receipt of a bale to smoothly accelerate the bale to a maximum velocity in a relatively short space.

The foregoing and other objects are achieved in a bale thrower in which a pair of bale throwing arms are mounted for pivotal movement about a horizontal axis between a downwardly projecting bale receiving position and a substantially horizontal bale launching position. A bale handled by the thrower is supported upon a curved chute which is coextensive with the path of movement of the bale throwing arms and whose discharge end can be adjusted at various inclinations to influence the trajectory of the thrown bale. The bale throwing arms are driven in movement by a reciprocating hydraulic ram which is coupled to the arms through a linkage which accelerates the arms from a dead rest position at either end of their stroke to a maximum velocity which, in the throwing stroke, is reached slightly beyond the midpoint of the path of travel of the arms. The hydraulic ram is supplied with fluid under pressure by the conventional tractor driven pump, thus eliminating any necessity of accurately aligning a power driven shaft or linkage with the baler mechanism or tractor power takeoff shaft. The hydraulic ram is automatically controlled in a manner such that in addition to the deceleration at the end of each stroke achieved by the arm driving linkage, the ram acts as a hydraulic shock absorber, thereby cushioning the mechanism at each end of each stroke.

Other objects and features of the invention will become apparent by reference to the following specification and to the drawings.

In the drawings:

FIGURE 1 is a side elevational view, with certain parts broken away or omitted, showing a bale thrower embodying the present invention mounted upon the discharge end of a conventional hay baler;

FIGURE 2 is a plan view, with certain parts omitted, of the bale thrower of FIGURE 1;

FIGURE 3 is a side elevational view, partially schematic, of the bale throwing mechanism;

FIGURE 4 is a detail cross sectional view taken on line 4—4 of FIGURE 3;

FIGURE 5 is a schematic diagram of the hydraulic control circuit.

Referring first to FIGURE 1, the bale throwing mechanism includes a pair of vertically disposed side frame members 10 each having an inclined leg 12 and a vertical leg 14, one side frame member being fixedly mounted at each side of the hay baler frame 16 at the discharge end of the baler. At the upper end of each side frame member 10, an upwardly inclined support plate 18 is fixedly secured to each frame member. A shaft 20 extends transversely between plates 18 and is supported for rotation about a stationary horizontal axis as by bearing assemblies 22 mounted at the upper end of each plate.

A pair of bale throwing arms 24 are fixedly secured to shaft 20, as by welding, and are preferable interconnected as by a cross frame member 26 so that the arms 24 move together as a rigid unit upon rotation of shaft 20. Also fixedly secured to shaft 20 are a pair of crank arms 28 which, as best seen in FIGURES 1 and 3, project from shaft 20 at a slight angle from bale throwing arms 24. Cranks 28, arms 24 and shaft 20 constitute a single rigidly interconnected unit which is supported for pivotal movement about the horizontal axis defined by the fixedly supported bearing assemblies 22.

Each of cranks 28 is formed with an elongate slot 30 which extends radially of the axis of shaft 20. A transversely extending horizontal shaft 32 projects through and beyond the slots 30 of both cranks 28, as best seen in FIGURE 2, and within each slot 30 a bearing 34 rotatably mounted upon shaft 32 is engageable with either of the longitudinal edges of slot 30. The diameter of bearing 34 is slightly less than the width of slot 30 so that the bearing can contact only one longitudinal edge of the slot at a time.

Shaft 32 is in turn supported by a pair of constraining links 36 which are pivotally connected at one end to shaft 32 and pivotally supported at their opposite end upon a fixed pivot 38 mounted upon a rigid support platform 40. Platform 40 is fixedly supported by and between side frame members 10 as by a cross frame member 42 (FIGURE 2).

The cylinder 44 of a reversible hydraulic ram is pivotally supported at 46 upon platform 40, the ram being aligned to reciprocate the piston rod along a path lying in a vertical plane normal to the axis of shaft 20. The piston rod 48 of the ram has a saddle 50 rigidly mounted upon the piston rod with two rigid arms 52 extending rearwardly from the saddle along opposite sides of cylinder 44 when piston rod 48 is fully retracted. A forked drive link 54 has its fork end pivotally connected to the respective arm 52 as at 56 while the opposite end of drive link 54 is pivotally connected to shaft 32 midway between the constraining links 36.

As shown in FIGURE 1, and in full line in FIGURE 3, when piston rod 48 of the hydraulic ram is fully retracted into its cylinder 44, bale throwing arms 24 are located by the linkage consisting of driving link 54, constraining links 36 and cranks 28 in an elevated or bale launching position. When piston rod 48 of the hydraulic ram is fully extended, as indicated in broken line in FIGURE 3, the linkage constrains bale throwing arms 24 to be located in a downwardly projecting position relative to shaft 20 which constitutes the bale receiving position. By reference to FIGURE 1, it will be apparent that when bale throwing arms 24 are in their bale receiving position, the distal ends of the arms are disposed just rearwardly of the rear or discharge end of the baler.

An upwardly curved bale guiding chute 58 has its lower end supported upon baler frame 16 to form a continuation of the bale supporting surface of baler frame 16 and is then curved upwardly, as best seen in FIGURE 1, to terminate at a position somewhat below that of the bale launching position of bale throwing arms 24. Chute 58 is constructed to possess some flexibility and the discharge end 60 of the chute may be adjustably supported at various inclinations by a pair of tension straps, such as 62, pivotally coupled to side frame members as at 64 (FIGURE 1) and having a series of bolt holes such as 66 by means of which the inclination of the discharge end 60 of chute 58 may be adjusted.

The purpose of chute 58 is to support and guide a bale gripped between the distal ends of bale throwing arms 24 as the arms are driven from their downwardly extending bale receiving position upwardly to the bale launching position shown in FIGURE 1. Safety screens 67 are preferably mounted at each side of chute 58.

At the distal end of bale throwing arms 24, bale gripping fingers 68 are mounted for pivotal movement about an axis extending longitudinally of the arms.

As best seen in FIGURE 4, each finger 68 takes the form of a spring steel member which is fixedly secured at one end to arms 24 as by bolts 70, and inclined inwardly across and beyond the arms. The distal ends of arms 24 are spaced from each other in accordance with the horizontal width of a bale such as indicated in broken line at B in FIGURE 3, so that when the arms are in the vertical bale receiving position, the lower ends of the arms are closely adjacent each side of the bale. Fingers 68 project inwardly from arms 24 and dig into the side of the bale. The inclination and resiliency of fingers 68 is such that when a bale is driven from the baler between the arms, fingers 68 can flex outwardly to permit the bale to be driven between the fingers to the approximate position shown in FIGURE 3. However, upon movement of bale throwing arms 24 from the bale receiving position shown in broken line in FIGURE 3, the inertia of the bale tends to flex fingers 68 inwardly to dig more firmly into the side of the bale to carry the bale along with the bale throwing arms.

Actuation of the hydraulic ram to drive bale throwing arms 24 between the bale receiving position and bale launching position is automatically controlled throughout a cycle which is triggered by the movement of a bale B into the bale receiving position indicated in broken line in FIGURE 3. As indicated in FIGURE 5, the rod and head ends of the cylinder 44 of the hydraulic ram are connected by a rod end conduit 70 and a head end conduit 72 to the control ports of a mechanically actuated three-position four-way reversing valve 74. The remaining ports of the four-way valve 74 are connected to a source of hydraulic power in the form of a hydraulic pump 76 whose intake is connected to valve 74 by a suction or exhaust conduit 78 while the pressure side of the pump is connected to valve 74 by a pressure conduit 80. The conventional hydraulic pump usually found on the tractor which draws the baler serves as pump 76.

In FIGURE 5, the valve spool 82 is positioned to head end conduit 72 to pressure conduit 80 while connecting rod end conduit 70 to the exhaust conduit 78, thus causing the pump to drive piston rod 78 in an extending direction from cylinder 44. Upon movement of valve spool 82 to the opposite end of its casing, a set of cross connections is established to connect pressure conduit 80 to rod end conduit 70 while connecting head end conduit 72 to the suction or exhaust conduit 78. Valve spool 82 also has an intermediate or centered position in which all conduits leading to and from the valve are blocked. Valve spool 82 is mechanically positioned within the valve by means of a projecting stem 84, which is pivotally coupled as at 8y to one end of a lever 88.

Referring now to FIGURE 3, lever 88 is supported intermediate its ends by a fixed pivot 90 which is located in a suitable position upon one of side frame members 10. The opposite end of lever 88 is pivotally connected as at 92 to one end of an actuating link 94 whose opposite end is pivotally supported by a fixed pivot 96 which may likewise be located at a suitable position upon a side frame member 10.

Saddle member 50 which is fixedly mounted upon piston rod 48 of the hydraulic ram carries an elongate bracket 98 from which project transversely extending pins 100 and 102 which are engageable with actuating link 94 at various points during the cycle to shift link 94, thereby driving lever 88 to shift valve stem 84. Pin 100 functions as a reversing pin, while pin 102 functions as a neutralizing pin to shift valve 74 to its neutral or blocking position at the conclusion of the cycle.

As best seen in FIGURE 3, a compression spring 104 has its opposite ends coupled to an intermediate location 106 on actuating link 94 and to one end of a bell crank lever 108 which is pivotally supported upon a fixed pivot 110 and is provided with a resilient feeler 112 at the end of lever 108 remote from its connection to spring 104. Feeler 112 is employed to detect the arrival of a bale at the bale receiving position.

At the start of a bale throwing cycle, bale throwing arms 24 are positioned in their vertical bale receiving position shown in broken line in FIGURE 3. At this time, piston rod 48 of the hydraulic ram is fully extended, as indicated in broken line in FIGURE 3, actuating link 94 and lever 88 are both disposed in a vertical position, and valve 74 is positioned in its centered or blocking position. Constraining link 36, drive link 54 and cranks 28 are likewise indicated in their bale receiving positions in broken line in FIGURE 3.

At this time, bell crank 108 is positioned in the full line position shown in FIGURE 3, while awaiting the arrival of a bale from the baler.

As a bale is discharged from the baler, it moves horizontally from left to right as viewed in FIGURE 3, until the bale B arrives at the position shown in broken line in FIGURE 3. Movement of the bale into the indicated position in FIGURE 3 causes the bale to pass between the lower or distal ends of arms 24 and as the bale moves into the position of FIGURE 3, feeler 112 is engaged by the leading edge of the bale and moved upwardly to the broken line position of FIGURE 3. This action causes bell crank 108 to pivot about its fixed pivot 110 in a counterclockwise direction, thereby compressing spring 104 which forces link 94 to the left, thereby pivoting lever 88 in a clockwise direction to pull valve stem 84 to the left. This movement of the valve stem shifts the valve from its neutral or blocking position to position the cross connections of the valve in alignment with the valve ports, thereby supplying hydraulic power from pump 76 to drive the ram in a direction retracting piston 48.

The retracting of piston rod 48 forces the lefthand end of drive link 54 to the right from its broken line position in FIGURE 3, movement of the righthand end of drive link 54 being constrained by constraining link 36 so that shaft 32 is forced to move in a clockwise direction along an arc centered on fixed pivot 38. At the beginning of the retracting stroke, bearings 34 on shaft 32 are located at the extreme lower ends of slots 30 in crank 28 and during the initial phase of the retracting movement of the piston, the direction motion of the axis of shaft 32 and bearings 34 is substantially parallel to the longitudinal extent of slots 30. As the retracting movement of piston rod 48 continues, the direction of movement of the axis of shaft 32 and bearings 34 moves out of parallelism with the longitudinal extent of slots 30 at a continuously increasing rate, this rate further being amplified by the fact that crank 20 is now pivoting about the axis of shaft 20 to move the longitudinal sides of slot 30 toward perpendicular relationship with the path of movement of shaft 32.

The increasing rate of movement of bearings 34 to the right as viewed in FIGURE 3 is further combined with a reduction of the length of the lever arm between the axis of shaft 20 and point of application of the driving force exerted by bearing 34 on the crank. Thus, during the initial movement of throwing arms 24 from their vertical bale receiving position, the arms are driven slowly, but as the movement continues, the rate of acceleration increases rapidly so that the arms reach a maximum velocity somewhat beyond their half-way point between the bale receiving and launching position. As crank 28 and constraining link 36 move beyond the point of longitudinal alignment with each other, a reversal of the foregoing action begins to occur and the velocity of the bale throwing arms begins to decrease as they approach the end of their launching movement.

Returning now to the initial portion of the movement of the bale throwing arms from the bale receiving position, the arms first move quite slowly and are then accelerated at an increasing rate. The initial movement of the arms, because of the inertia of the bale, acts primarily to flex the bale gripping fingers inwardly to more firmly bite into the side of the bale, so that by the time the arms begin to move with any substantial velocity, fingers 68 are firmly seated in the sides of the bale to push the bale along chute 58 as the arms swing upwardly. The continuous acceleration of arms 24 causes the velocity of the bale to rapidly increase, with the bale reaching its maximum velocity about at the time the leading end of the bale passes upwardly beyond the chute supporting straps 62 (FIGURE 1). As described above, beyond this point the velocity of the bale throwing arms starts to reduce. Because of the fairly substantial mass of the bale and its relatively high velocity at this point, the bale at this time possesses a substantial momentum. Thus, as the bale throwing arms begin to slow down, the bale continues to move with substantially its maximum velocity and as the bale begins to move forwardly from the arms, fingers 68 begin to flex outwardly, thus, releasing the bale which is then flung from the discharge end of chute 58 with a substantial velocity upwardly and rearwardly along an arc which is determined primarily by the inclination of the end of chute 58.

Bale throwing fingers 68 exert little resistance to movement of the bale relative to throwing arms 24 and hence it is not necessary that the curvature of chute 58 be exactly centered on the axis of shaft 20. In fact, that portion of the chute beyond straps 62 normally extends in a tangential direction.

Returning now to FIGURE 3, as piston rod 48 approaches its fully retracted position, reversing pin 100 strikes the lefthand side of actuating link 98 to swing the link counterclockwise about pivot 96 to shift valve 74 through its blocking position to the FIGURE 5 position to reverse the hydraulic connections to the ram cylinder, thereby connecting the head end of the cylinder to the pressure side of pump 76 and exhausting the rod end to cause the piston rod 48 to move in extending movement from piston 44. The piston rod is carried through to completely reverse the valve by the movement of arms 24, the ram acting as a hydraulic shock absorber to cushion the end of the stroke of arms 24. Extension of the piston rod restores throwing arms 24 to their bale receiving position in a reversal of the action described above. As the arms approach their bale receiving position, neutralizing pin 106 strikes the righthand side of actuating link 98 to swing the link back into the vertical or neutralizing position of valve 74 as the piston rod arrives at its fully extended position.

The trajectory of the bale thrown by the apparatus described above is selected in accordance with the dimensions of the wagon which is towed behind the bale thrower. The usual practice is to throw the bales along an arc such that they land or strike on or near the rear wall of the wagon. Wagons employed with the bale thrower are provided with relatively high sides, i.e., in the order of 8 to 10 feet above the wagon bed, and as the bales begin to pile up at the back of the wagon, the later bales tumble forward to fill the front of the wagon. The bale trajectory is adjusted by selecting the angle of inclination of the discharge end of curved chute 58 and by adjustably regulating the pressure of the fluid supplied to the hydraulic ram.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. A bale thrower comprising a frame, a pair of bale throwing arms mounted upon said frame for simultaneous pivotal movement about a horizontal axis between a depending bale receiving position and an elevated bale launching position, bale gripping means at the distal ends of said arms adapted to grip a bale therebetween, a constraining link pivotally mounted at one end on said frame, a crank fixedly secured to said arms and slidably coupled to the other end of said constraining link, reversible hydraulic ram means having a piston member and a cylinder member, means coupling one of said members to said frame, a drive link pivotally coupled at one end to the other of said members, means pivotally coupling the other end of said drive link to said other end of said constraining link to drive said crank to swing said arms from said receiving position to said launching position upon actuation of said ram means in one direction and to swing said arms from said launching position to said receiving position upon actuation of said ram in the reverse direction, and hydraulic ram control means operable in response to the presence of a bale between said arms when said arms are in said receiving position to actuate said ram in said one direction and operable in response to the arrival of said arms at said launching position to actuate said ram to return said arms to said receiving position.

2. A bale thrower comprising a frame, a shaft mounted in said frame for pivotal movement about a horizontal axis, a pair of bale throwing arms fixedly mounted upon said shaft for pivotal movement therewith between a depending bale receiving position and an elevated bale launching position, bale gripping means at the distal ends of said arms adapted to grip a bale therebetween, a crank fixedly secured to said shaft and having an elongate slot therein extending radially of said axis, a drive link having a pivot at one end slidably received in said slot to couple said drive link to said crank for pivotal and sliding movement relative to said crank, reversible hydraulic ram means including a cylinder coupled to said frame and a piston rod pivotally coupled to the other end of said drive link, means constraining movement of said pivot relative to said frame to transmit movement of said piston rod to said crank to swing said arms from said receiving position to said launching position upon movement of said piston rod in one direction and to swing said arms from said launching position to said receiving position upon movement of said piston rod in the reverse direction, and hydraulic ram control means operable in response to the presence of a bale between said arms when said arms are in said receiving position to drive said piston rod in said one direction and operable in response to the arrival of said arms at said launching position to drive said piston rod in the reverse direction to return said arms to said receiving position.

3. A bale thrower comprising a frame, a shaft mounted on said frame for pivotal movement about a horizontal axis, a pair of bale throwing arms fixedly mounted upon said shaft for pivotal movement therewith between a vertically depending bale receiving position and a substantially horizontal bale launching position, bale gripping means at the distal ends of said arms adapted to grip a bale therebetween, arm driving link means coupled to said bale throwing arms, reversible hydraulic ram means including a cylinder coupled to said frame and a piston rod coupled to said link means for driving said link means to swing said arms from said receiving position to said launching position upon actuation of said piston rod in one direction and to swing said arms from said launching position to said receiving position upon actuation of said piston in the reverse direction, a source of hydraulic fluid under pressure, a three-position four-way reversing valve hydraulically connected between said source and the cylinder of said ram to supply fluid under pressure to said cylinder to drive said piston rod in said one direction when said valve is at one end position and to supply fluid under pressure to said cylinder to drive said rod in said reverse direction when said valve is at its opposite end position, said valve being operable in a centered position to block communication between said source and said cylinder, first valve actuating means operable in response to the presence of a bale between said arms when said arms are in said receiving position to shift said valve from its centered position to said one end position, second valve actuating means on said piston rod operable in response to the arrival of said arms at said launching position to actuate said valve to said opposite end position to return said arms to said receiving position, and third valve actuating means on said piston rod operable in response to the arrivel of said arms at said receiving position for restoring said valve to its centered position.

References Cited by the Examiner
UNITED STATES PATENTS

| | | | |
|---|---|---|---|
| 2,772,007 | 11/1956 | Johnson | 214—80 |
| 2,785,811 | 3/1957 | Forth | 198—157 |

EVON C. BLUNK, *Primary Examiner.*

RICHARD E. AEGERTER, *Examiner.*